United States Patent [19]

Zeisler et al.

[11] Patent Number: 5,549,334
[45] Date of Patent: Aug. 27, 1996

[54] RETAINING BAND ASSEMBLY FOR INTERNAL PIPE SEALS

[75] Inventors: Kurt E. Zeisler, Rockbridge, Ohio; Ralph E. Miller, Coatsville, Ind.

[73] Assignee: Miller Pipeline Corporation, Indianapolis, Ind.

[21] Appl. No.: 326,487

[22] Filed: Oct. 20, 1994

[51] Int. Cl.⁶ .................................................. F16L 21/00
[52] U.S. Cl. .................... 285/189; 285/370; 285/379; 24/20 TT; 52/20
[58] Field of Search ................... 52/20; 285/189, 285/370, 379; 24/20 R, 20 TT

[56] References Cited

U.S. PATENT DOCUMENTS

| | | | |
|---|---|---|---|
| 3,960,395 | 6/1976 | Cirule et al. | 285/370 |
| 4,319,385 | 3/1982 | Marchou | 24/20 TT |
| 4,469,467 | 9/1984 | Odill et al. | 52/20 |
| 4,478,437 | 10/1984 | Skinner | 285/189 |
| 4,737,220 | 4/1988 | Ditcher et al. | 52/20 |
| 4,746,127 | 5/1988 | Westhoff et al. | 52/20 |
| 4,927,290 | 5/1990 | Bowman | 52/20 |
| 5,150,927 | 9/1992 | Skinner | 285/189 |
| 5,209,601 | 5/1993 | Odill et al. | 52/20 |
| 5,316,407 | 5/1994 | Miller | 52/20 |
| 5,431,553 | 7/1995 | Topf, Jr. | 405/38 |

FOREIGN PATENT DOCUMENTS

| | | | |
|---|---|---|---|
| 394127 | 10/1990 | European Pat. Off. | 285/370 |
| 1265514 | 4/1968 | Germany | 285/370 |
| 317843 | 11/1969 | Sweden | 285/370 |

OTHER PUBLICATIONS

"WEKO–SEAL® Internal Joint Sealing System for Water and Wastewater Piping", Miller Pipeline Corp. brochure, 1989.

"The Leaks Stop Here", Miller Piipeline Corp. brochure, undated.

*Primary Examiner*—Eric K. Nicholson
*Attorney, Agent, or Firm*—Barnes & Thornburg

[57] ABSTRACT

A retaining band assembly is provided for use in retaining a seal inside a pipe. The retaining band assembly includes a retaining band having a first end portion and a second end portion. The first end portion of the retaining band has a flat surface and a first edge and the second end portion of the retaining band has a second edge. An expansion block is mounted on the flat surface of the retaining band in spaced-apart relation from the first edge to define a receiving surface on the flat surface. The expansion block includes an upright face extending in a direction generally normal to the flat surface. The second end portion is arranged to engage the receiving surface so that the upright face of the expansion block is positioned to lie in spaced-apart confronting relation to the second edge of the second end portion. A clip engages the second end portion and the first end portion adjacent to the receiving surface. The second edge is disposed between the expansion block and the clip.

29 Claims, 3 Drawing Sheets

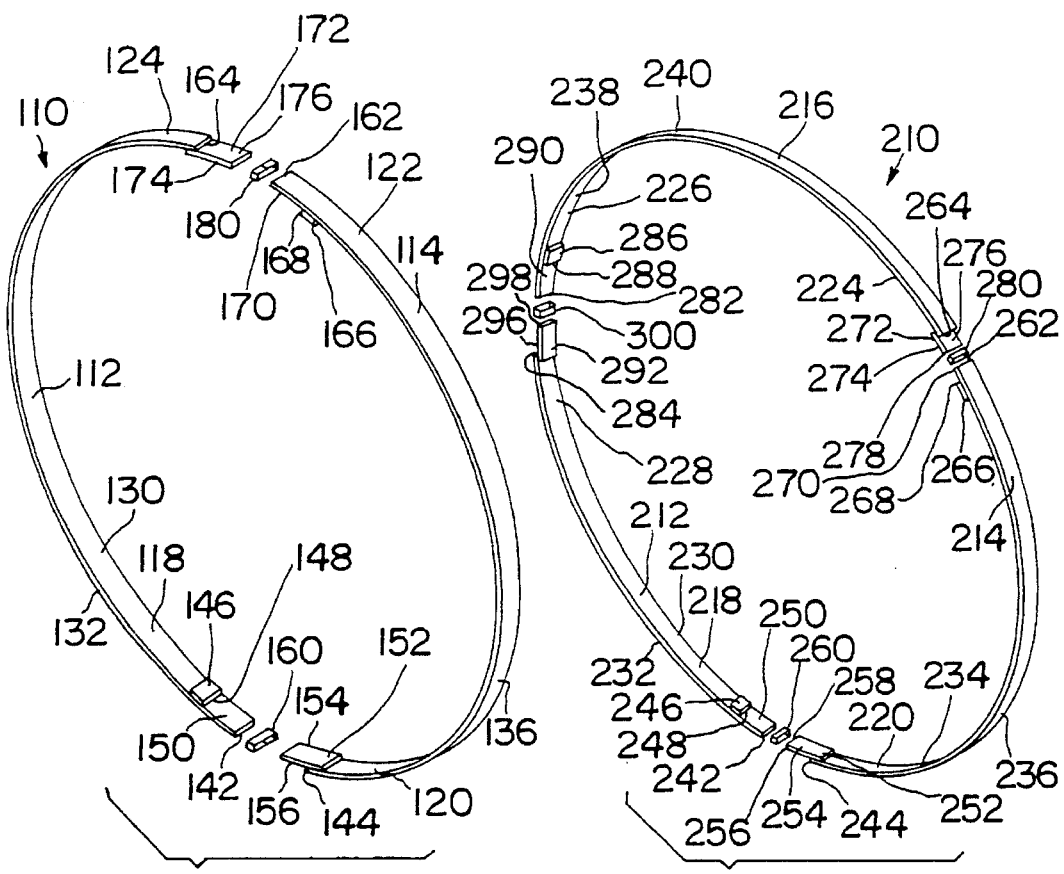

RETAINING BAND ASSEMBLY FOR INTERNAL PIPE SEALS

The present invention relates to a retaining band assembly for holding a seal in place at an internal pipe joint, and particularly to connectors for joining together two ends of a retaining band. More particularly, the present invention relates to a pipe joint rehabilitation system including a low-profile clip that aligns and holds the ends of a seal-retaining band in sliding engagement.

Underground pipe is used to conduct fresh water, waste water, gas, or other fluids and must be rehabilitated periodically. Leaking joints in water piping result in lost product, lost pumping energy, and damage to the surroundings. Leaking waste water pipe joints result in infiltration that often creates a need for expensive increases of waste water treatment capacity. Contamination of the surrounding environment as a result of leakage is also an important issue.

One method of rehabilitating leaking pipe joints includes forming a mold cavity on the interior of the pipe around the joint with a mold appliance, conducting sealing material through the mold appliance and into the joint, and curing the sealing material. The cured sealing material seals the gap between the pipes. For example, U.S. Patent Application Ser. No. 07/766,628 to Topf, now abandoned discloses such a molding procedure.

Another method for rehabilitating leaking pipe joints is to install an annular section of resilient sealing material in a position bridging the joint gap and lying in the joint area on the interior of the pipe. The annular sealing material is fixed to the joint by retaining bands positioned on each side of the joint. The retaining bands are expanded against the annular sealing material to form a seal between the annular sealing material and the pipe adjacent to each retaining band. Retaining bands are formed from elongated strips of flexible, carbon steel materials or non-corrosive materials such as stainless steel, the ends of which are joined together using a pair of threaded bolts.

An improved retaining band coupling technique would simplify the manufacture of retaining bands and add to the convenience of pipe rehabilitation. What is needed is a mechanism for joining the retaining band ends without penetrating the retaining band ends or requiring that the retaining band ends be processed through machining operations. Desirably, such a mechanism would include fewer parts, thereby simplifying the installation of the retaining bands. Ideally, such a mechanism would be configured to produce a retaining band end coupling that lies essentially flush with the radially inwardly facing surfaces of the retaining bands and permit lengthwise relative motion of the joined retaining band ends during expansion of the retaining bands.

According to the present invention, a retaining band assembly including a retaining band having a first end and a second end is provided. The first end has a flat surface and a first edge and the second end has a second edge. An expansion block is mounted on the flat surface in spaced-apart relation to the first edge to define a receiving surface between the expansion block and the first edge. The second end is arranged to engage the receiving surface. A clip engages the second end and the first end adjacent to the receiving surface. The second edge lies between the expansion block and the clip.

In preferred embodiments, the radially inwardly facing top surface of the retaining band is flat and the one-piece clip includes a flat top wall which is held essentially flush with the top surface of the retaining band. Two spaced-apart side walls maintain the longitudinal alignment of the retaining band ends and two tabs are provided for holding the clip in place around the ends of the retaining band. The tabs are positioned in a spaced-apart relation with the top wall to permit lengthwise movement of the retaining band ends relative to one another during expansion of the retaining band while maintaining the integrity of the connection after installation is complete.

A clip in accordance with the present invention can be used to hold the ends of the seal-retaining band together, providing a lower profile than other coupling techniques and resulting in less interference with flow in a pipeline. Illustratively, the clip has a C-shape or an O-shape and is made of copper or copper alloy, carbon steel, stainless steel, or any other metal, as well as plastic, fiberglass, or other resin or resin composite. The clip is configured to slide over the retaining band ends and hold the ends together. Further, the clip is sized to allow the retaining band ends to slide relative to one another during expansion of the retaining band, and there are several clip sizes to suit different band thicknesses.

Retaining band assemblies designed to include a clip in accordance with the present invention are manufactured without the need for any threaded bolts or any connectors formed to include bolt-receiving slots or drilled and tapped bolt-receiving holes. This simplification results in a reduction of manufacturing time and manufacturing costs, a reduction of the number of component parts, and simplification of the installation procedure.

Advantageously, a method is provided for closing gaps between pipes using a retaining band assembly including a clip in accordance with the present invention. The method includes the steps of positioning sealing material on the inside of the pipe along the gap and forming two retaining bands. The retaining bands are formed by inserting the first end and the second end of a first retaining strip into a first alignment clip and inserting the first end and the second end of a second retaining strip into a second alignment clip. Once the retaining bands are formed, gap closure is achieved by engaging the sealing material with the retaining bands, placing a first seal guard between the seal and the first alignment clip tabs, placing a second seal guard between the seal and the second alignment clip tabs, expanding the retaining bands, and installing a locking device on each retaining band.

Rehabilitation of a pipe joint is more convenient when completed with a retaining band assembly including a clip according to the present invention. Formation of the retaining band requires only that the two retaining band ends are inserted into the clip with no need to install bolts or additional hardware. The positioning of the clip tabs relative to the clip top wall permits lengthwise motion of the retaining band ends as the band is expanded against the sealing material, and ensures that the clip does not interfere with the range of expansion that may be attained by the retaining band. Providing a coupling mechanism that includes no radially inwardly facing protrusions removes both the potential for clip interference with the band expansion procedure and the potential for clip interference with the flow through the pipeline.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 5 is a perspective view of an unassembled retaining band assembly in accordance with another embodiment of the invention showing two retaining band strips and two C-shaped clips, each retaining band strip including one end carrying an expansion block and another end carrying a tongue;

FIG. 6 is a perspective view of an unassembled retaining band assembly in accordance with yet another embodiment of the invention showing three retaining band strips and three C-shaped clips, each retaining band strip including one end carrying an expansion block and another end carrying a tongue;

FIG. 7 is an enlarged elevation view of the C-shaped clip of FIGS. 1–6 showing a clip top wall, a first side wall with a first tab, and a second side wall with a second tab spaced apart from the first tab;

FIG. 8 is a bottom plan view of the C-shaped clip of FIG. 7 showing a clip top wall, a first tab, and a second tab;

FIG. 9 is an elevation view of a second embodiment of a clip in accordance with the present invention showing an O-shaped clip having a clip top wall, a first side wall with a first tab, and a second side wall with a second tab touching the first tab; and FIG. 10 is a bottom plan view of the O-shaped clip of FIG. 9 showing a first tab and a second tab.

DETAILED DESCRIPTION OF THE DRAWINGS

The components of a first embodiment of a retaining band assembly are illustrated in FIGS. 1–4. A second embodiment of a retaining band assembly is illustrated in FIG. 5 and a third embodiment is illustrated in FIG. 6. A first embodiment of a clip for aligning and retaining the ends of a retaining band is shown in FIGS. 7–8 and a second embodiment of the clip is shown in FIGS. 9–10. Each of these clips maintains a longitudinal alignment of the retaining band ends without penetrating the ends of the retaining bands and without interfering with the expansion of the retaining band during its installation into a pipe joint seal.

Figure 1:
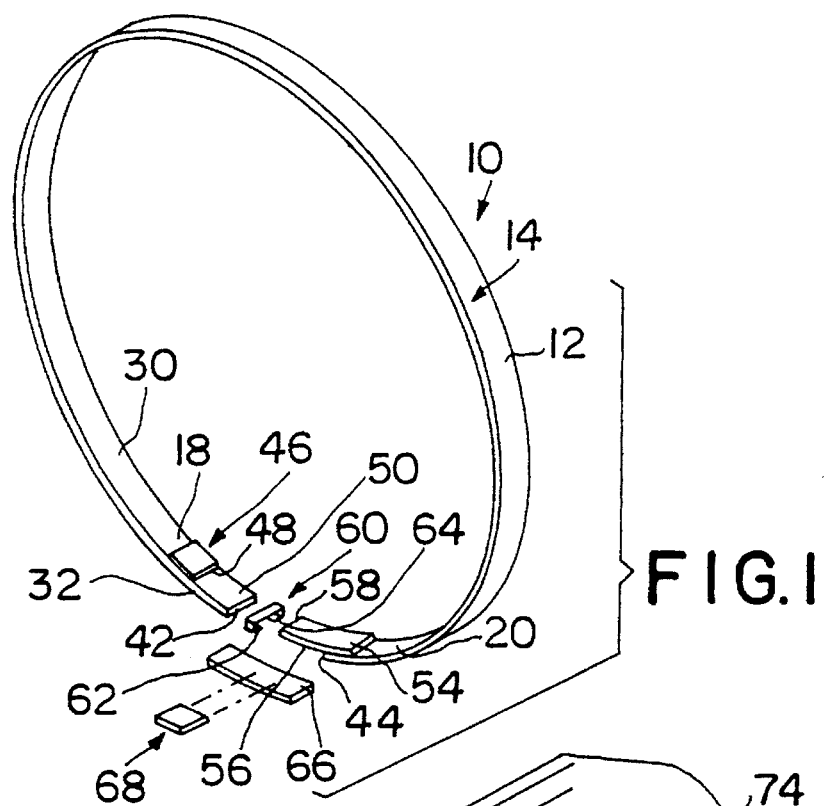
FIG. 1 is an exploded perspective view of an unassembled retaining band assembly in accordance with a first embodiment of the present invention showing a retaining band having a left end including an expansion block, a right end including a tongue, a C-shaped clip between the left end and the tongue, a thin seal guard positioned below the C-shaped clip, and a wafer-like square locking block movable along dotted lines to assume a position lying in a space bounded by the left end, the tongue, the right end, and the seal guard.

Referring now to FIG. 1, retaining band assembly 10 includes a retaining band 14 having a first end 18, a second end 20, a radially inwardly facing top surface 30, and a radially outwardly facing bottom surface 32. The first end 18 of retaining band 14 includes a first edge 42 and the second end 20 of retaining band 14 includes a second edge 44. An expansion block 46 with an expansion block edge 48 is mounted on the retaining band top surface 30 on the first end 18 in spaced-apart relation to the first edge 42 to define a tongue-receiving surface 50. A tongue 52 including a top surface 54 and a bottom surface 56 is attached to the top surface 30 on the second end 20 extending beyond the second edge 44.

Figure 2:
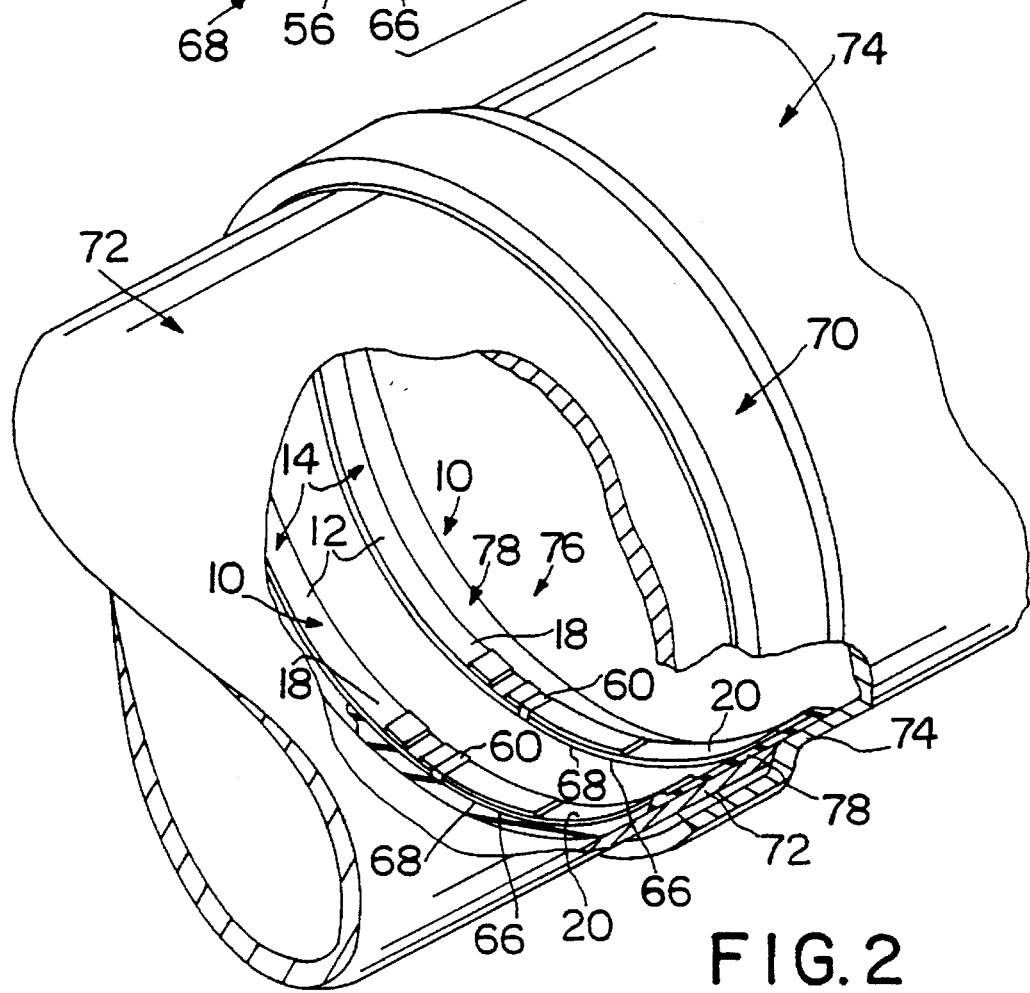
FIG. 2 is a perspective view of a joint between two pipes with a portion broken away showing an annular seal held in place at the joint by two retaining band assemblies of the type shown in FIG. 1.

A seal guard 66 is a long, very thin shim that is positioned beneath the first and second ends 18, 20 as shown in FIGS. 1 and 2. A locking block 68 is positioned to lie between the retaining band 14 and the seal guard 66 and a clip 60 is positioned to lie adjacent to the first end 18, the tongue 52, and the seal guard 66. The clip 60 includes a first tab 62 and a second tab 64. As shown best in FIG. 4, when the retaining band assembly 10 is installed inside a pipe joint 70, the clip 60 encircles the tongue 52 and the first end 18, and the clip tabs 62, 64 lie between the first end 18 and the seal guard 66. The locking block 68 is positioned to lie between the tongue 52 and the seal guard 66 and is wedged between the first edge 42 and the second edge 44.

Referring now to FIG. 2, a pipe joint 70 is provided between a first pipe section 72 and a second pipe section 74. The pipe joint 70 includes an installed joint seal 76 including joint sealing material 78 and two retaining band assemblies 10 of the type shown in FIG. 1. Illustratively, the sealing material 78 is an annular section of resilient material such as EPDM (ethylene propylene diene monomer) used in the WEKO-SEAL® internal joint sealing system available from Miller Pipeline Corporation of Indianapolis, Ind. This sealing material 78 is sized to fit along the inner diameter of the pipe joint 70. The sealing material 78 spans pipe joint 70 and is placed in contact with areas of both the first pipe section 72 and the second pipe section 74. One retaining band assembly 10 contacts the sealing material 78 adjacent to the first pipe section 72 and the other retaining band assembly 10 contacts the sealing material 78 adjacent to the second pipe section 74. The installed retaining band assemblies 10 are in compression and exerting sufficient force on the sealing material 78 to form seals between the sealing material 78 and the first pipe section 72 and the second pipe section 74.

The installation of the joint seal 76 requires positioning sealing material 78 along the pipe joint 70 with the sealing material 78 overlapping both the first pipe section 72 and the second pipe section 74. A first retaining band 10 is assembled by inserting a retaining strip 12 into the pipe and inserting the first and second ends 18, 20 into a clip 60 without the need for using any threaded bolts or providing any connectors formed to include bolt-receiving slots or drilled and tapped bolt-receiving holes. A second retaining band 10 is assembled in the same manner.

The retaining band assemblies 10 are brought into engagement with the sealing material 78 with one retaining band assembly 10 engaging the sealing material 78 adjacent to the first pipe section 72 and the other retaining band assembly 10 engaging the sealing material 78 adjacent to the second pipe section 74. Seal guards 66 are placed between the retaining band first and second ends 18 and 20 and the sealing material 78.

Figure 3:
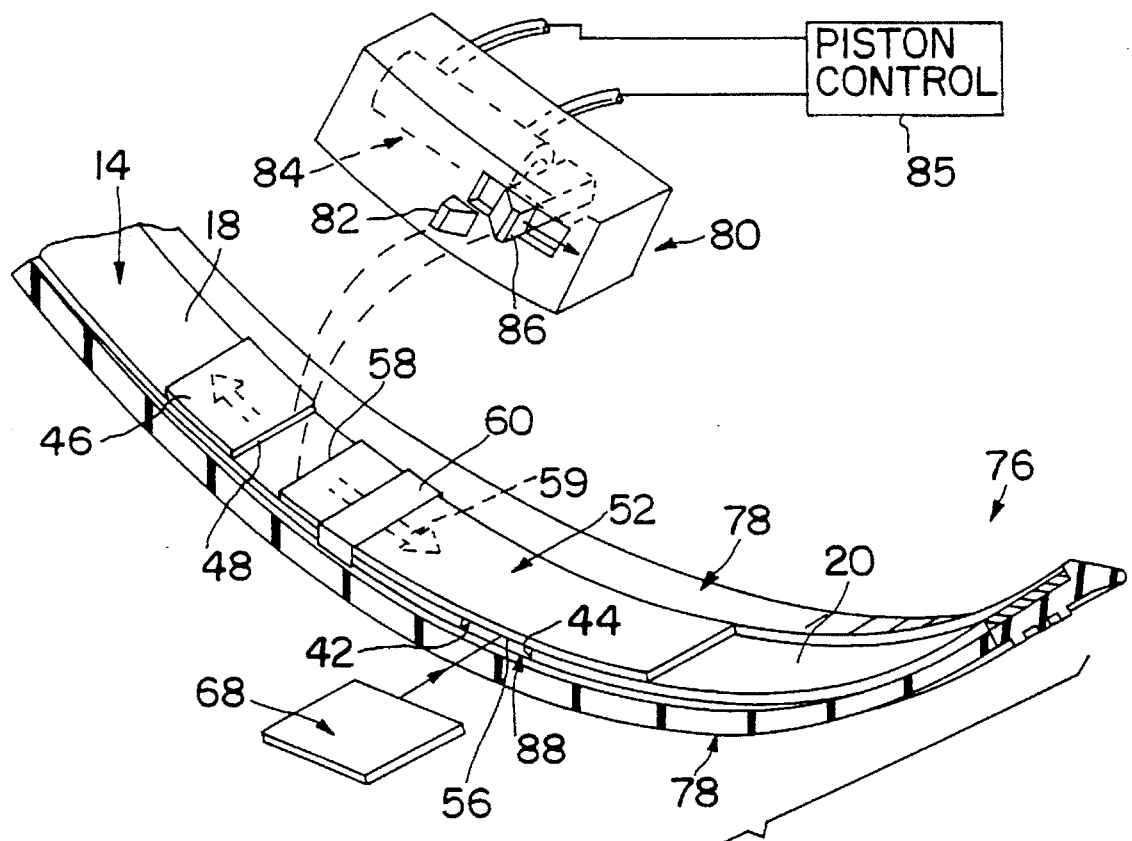
FIG. 3 is an enlarged perspective view of the retaining band assembly of FIGS. 1 and 2 prior to expansion of the band showing a hand-held band-expansion device that is operable to push the left and right ends of the retaining band in opposite directions to expand the retaining band an amount sufficient to permit a user to slide the appropriate locking block into a gap located between the left and right ends of the retaining band.

An enlarged view of a retaining band assembly 10 at a middle stage of the installation procedure is shown in FIG. 3. To complete installation of the joint seal 76, it is necessary to expand retaining band 14 as described below and install locking block 68.

A hand-held expansion device 80 is used to expand the retaining band 14 and includes, for example, a stationary finger 82, a piston 84, and an expansion finger 86. In use, the stationary finger 82 is positioned against the expansion block edge 48 and the expansion finger 86 is positioned against the leading edge 58 of tongue 52. The piston 84 is then activated using a piston control 85 so that expansion finger 86 is separated from the stationary finger 82, forcing the leading edge 58 of the tongue 52 to slide away from the expansion block edge 48 in direction 59. The clip 60 maintains the "longitudinal alignment" of the first and second ends 18, 20 and permits relative sliding movement between the first and second ends 18, 20 so that separation of the tongue edge 58 and the expansion block edge 48 results in the expansion of the internal diameter of the retaining band 14. The clip 60 does not limit the extent of relative sliding movement that may be achieved between the first and second ends 18, 20, and the clip 60 includes no radially inwardly extending protrusions that might interfere with placement of the expansion device 80, so that the extent of expansion is not limited by the clip 60.

The retaining band 14 is expanded until it exerts sufficient force against the annular sealing material 78 to form a tight seal between the sealing material 78 and the pipe sections 72 and 74. Once the expansion of retaining band 14 is complete, a locking block 68 is installed in the gap 88 bounded by first edge 42 of retaining band 14, tongue 54, second edge 44 of retaining band 14, and seal guard 66. The locking block 68 is sized to maintain the separation between the first and second edges 42, 44 that was achieved during the expansion of the retaining band 14 in order to maintain the force exerted by the retaining band 14 against the sealing material 78. During installation of retaining band assembly 10, the installer has available a supply of locking blocks of various sizes and lengths. Once the expansion of retaining band 14 is complete, the installer selects a locking block of the proper length and inserts it into gap 88.

Figure 4:
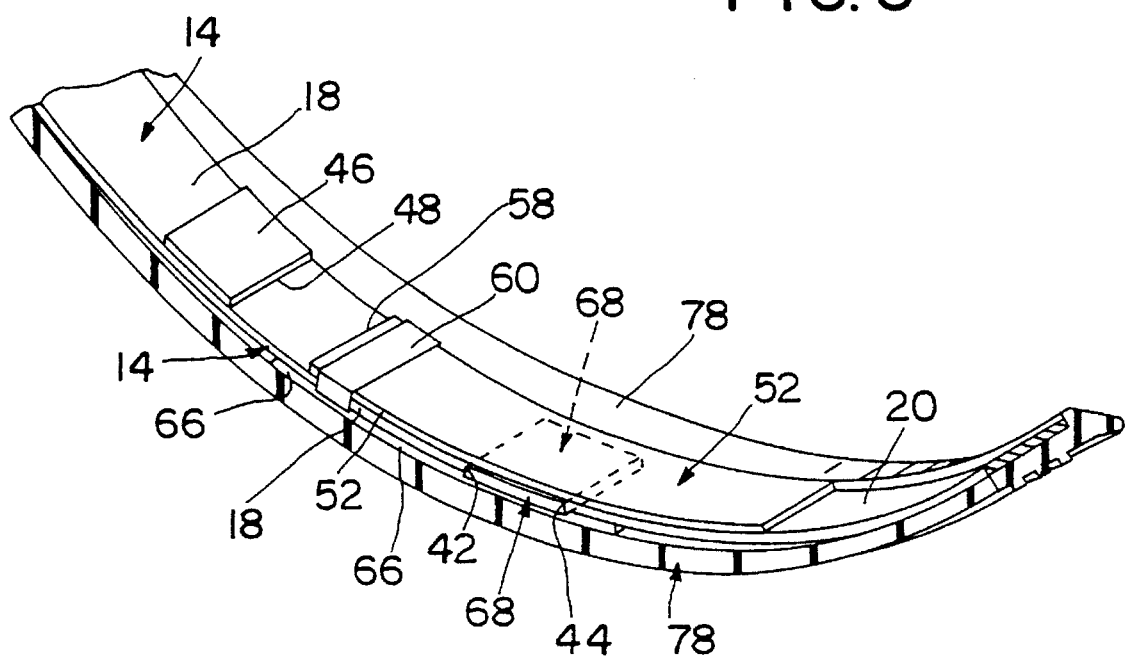
FIG. 4 is a view similar to FIG. 3 showing a fully expanded retaining band held in an expanded position by the locking block.

The retaining band assembly 10 as it appears following installation of the locking block 68 is shown in FIG. 4. Once installed, the leading edge 58 of tongue 52 is positioned between the clip 60 and the expansion block 46 and the locking block 68 is positioned between the tongue 52, the seal guard 66, the first edge 42, and the second edge 44. The clip tabs 62, 64 (not shown in FIG. 4) are positioned between the retaining band 14 and the seal guard 66.

A second embodiment of a retaining band assembly includes two retaining band segments or strips 112, 114. The ends of the retaining band segments 112, 114 are coupled to form a single retaining band with twice the circumference of a retaining band produced from one segment. This second embodiment is particularly useful in applications requiring small hole entrance into a pipeline such as a manhole, and also used when working in large diameter pipelines to reduce the weight that has to be carried by personnel.

Referring now to FIG. 5, an exploded view of a second embodiment of a retaining band assembly 110 including a first retaining strip 112 and a second retaining strip 114 is illustrated. The first retaining strip 112 includes a first end 118, a fourth end 124, a top surface 130, and a bottom surface 132. The second retaining strip 114 includes a second end 120, a third end 122, a top surface 134, and a bottom surface 136.

The first end 118 includes a first edge 142 and the second end 120 includes a second edge 144. A first expansion block 146 with a first edge 148 is mounted on the top surface 130 on the first end 118 in spaced-apart relation to the first edge 142 to define a first tongue-receiving surface 150. A first tongue 152, including a top surface 154 and a bottom surface 156, is attached to the top surface 134 of the second retaining strip 114 on the second end 120 to extend beyond the second edge 144. A first clip 160 encircles the first end 118 and the first tongue 152.

The third end 122 includes a third edge 162 and the fourth end 124 includes a fourth edge 164. A second expansion block 166 with a block edge 168 is mounted on the top surface 134 on the third end 122 in spaced-apart relation to the third edge 162 to define a second tongue-receiving surface 170. A second tongue 172, including a second tongue top surface 174 and a bottom surface 176, is attached to the top surface 130 on the fourth end 124 to extend beyond the fourth edge 164. A second clip 180 encircles the third end 122 and the second tongue 172. It will be readily apparent to one skilled in the art that the use of two segments in the retaining band assembly provides the benefits desired without affecting the improvements achieved by coupling the retaining band ends using a clip in accordance with the present invention.

A third embodiment of a retaining band assembly includes three retaining band segments or strips 212, 214, 216. The ends of the retaining band segments 212, 214, 216 are coupled to form a single retaining band with a circumference three times the circumference of a retaining band produced from one segment. The third embodiment is particularly useful in applications requiring small hole entrance into a pipeline such as a manhole, and also used when working in large diameter pipelines to reduce the weight that has to be carried by personnel.

Referring now to FIG. 6, an exploded view of a retaining band assembly 210 including a first retaining strip 212, a second retaining strip 214, and a third retaining strip 216 is illustrated. The first retaining strip 212 includes a first end 218, a sixth end 228, a top surface 230, and a bottom surface 232. The second retaining strip 214 includes a second end 220, a third end 222, a top surface 234, and a bottom surface 236. The third retaining strip 216 includes a fourth end 224, a fifth end 226, a top surface 238, and a bottom surface 240.

The first end 218 includes a first edge 242 and the second end 220 includes a second edge 244. A first expansion block 246 with a first edge 248 is mounted on the top surface 230 on the first end 218 in spaced-apart relation to the first edge 242 to define a first tongue-receiving surface 250. A first tongue 252, including a top surface 254 and a bottom surface 256, is attached to the top surface 234 on the second end 220 to extend beyond the second edge 244. A first clip 260 encircles the first end 218 and the first tongue 252.

The third end 222 includes a third edge 262 and the fourth end 224 includes a fourth edge 264. A second expansion block 266 with a second edge 268 is mounted on the top surface 234 on the third end 222 in spaced-apart relation to the third edge 262 to define a second tongue-receiving surface 270. A second tongue 272, including a top surface 274 and a bottom surface 276, is attached to the top surface 238 on the fourth end 224 to extend beyond the fourth edge 264. A second clip 280 encircles the third end 222 and the second tongue 272.

The fifth end 226 includes a fifth edge 282 and the sixth end 228 includes a sixth edge 284. A third expansion block 286 with a third edge 288 is mounted on the top surface 238 on the fifth end 226 in spaced-apart relation to the fifth edge 282 to define a third tongue-receiving surface 290. A third tongue 292, including a top surface 294 and a bottom surface 296, is attached to the top surface 230 on the sixth end 228 to extend beyond the sixth edge 284. A third clip 300 encircles the fifth end 226 and the third tongue 292.

A first embodiment of a clip 60 is illustrated in FIGS. 7 and 8 and a second embodiment of a clip 330 is illustrated in FIGS. 9 and 10. The clips 60 and 330 will be described with respect to the retaining band assembly 10 of FIG. 1, though it will be readily apparent to one skilled in the art that use of clips 60 and 330 for coupling all of the retaining band ends illustrated in FIGS. 1–6 is appropriate.

Referring now to FIGS. 7 and 8, an open "C-shaped" clip 60 includes a top wall 302, a first side wall 304 appended to the top wall 302, and a second side wall 306 appended to the top wall 302 and arranged to lie opposite to the first side wall 304. The clip 60 also includes a first tab 62 appended to the first side wall 304. The first tab 62 extends in a direction parallel to the clip top wall 302 toward the second side wall 306 and terminates at a first tab edge 310. A second tab 64 is appended to the second side wall 306. The second tab 64 extends in a direction parallel to the clip top wall 302 toward the first side wall 304 and terminates at a second tab edge 314. The tab edges 310 and 314 are positioned to lie in a spaced-apart parallel relation. An alignment gap 316 is the spacing between the opposing first and second side walls 304, 306 and an expansion gap 318 is the spacing between the top wall 302 and the first and second tabs 62, 64.

Referring now to FIGS. 9 and 10, a closed "O-shaped" clip 330 includes a top wall 332, a first side wall 334 appended to the top wall 332, and a second side wall 336 appended to the top wall 332 and arranged to lie opposite to the first side wall 334. The clip 330 also includes a first tab 338 appended to the first side wall 334 and arranged to extend parallel to the top wall 332 in a direction toward the second side wall 336, terminating in a first tab edge 340. A second tab 342 is appended to the second side wall 336. Second tab 342 extends parallel to the top wall 332 toward the first side wall 334, terminating in a second tab edge 344. The tab edges 340 and 344 are in engagement. An alignment gap 346 is the spacing between the opposing first and second side walls 334, 336 and an expansion gap 348 is the spacing between the top wall 332 and the first and second tabs 338, 342.

The alignment gaps 316, 346 of both the open C-shaped clip 60 and the closed O-shaped clip 330 are approximately the size of the width of the first end 18 and the tongue 52 to maintain the longitudinal alignment of the first end 18 and the second end 20 during installation and expansion of the retaining band 14. The alignment gaps 316, 346 are slightly larger than the width of the first end 18 and the tongue 52 to permit relative movement of the first end 18 and the tongue 52 during installation and expansion of the retaining band 14.

Likewise, the expansion gaps 318, 348 are sized to be approximately the same as the thickness of the retaining band 14 where the tongue 52 overlaps the retaining band first end 18. The expansion gaps 318, 348 are slightly larger than the distance from the bottom surface 32 on the first end 18 and the tongue top surface 54, to permit relative movement of the first end 18 and the tongue 52 during installation and expansion of the retaining band 14.

The top faces 320, 350 of the top walls 302, 332 are flat surfaces. The difference between the size of the expansion gaps 318, 348 and the distance from the bottom surface 32 on the first end 18 and the top surface 54 of the tongue 52 is minimized so that the top walls 302, 332 are held closely to the tongue top surface 32. This low-profile design eliminates any protrusions that might be produced with alternate coupling techniques and assures that the clip 60, 330 will not interfere with either the expansion procedure or the flow of fluids through the pipe.

The previously described versions of the present invention have many advantages. Use of a clip in accordance with the present invention eliminates the need for any threaded bolts or any connectors formed to include bolt-receiving slots or drilled and tapped bolt-receiving holes. This simplification of the retaining band design results in low manufacturing time and cost as well as a reduction of the number of component parts and simplification of the retaining band installation procedure. The installation procedure is further simplified by the low-profile clip that includes no radially inwardly extending protuberances that might interfere with placement of the expansion device during the expansion procedure. This ease of installation translates directly into reduced training requirements for field operatives and quick installation times.

Although the invention has been described in detail with reference to a preferred embodiment, variations and modifications exist within the scope and spirit of the invention as described and defined in the following claims.

We claim:

1. A retaining band assembly for use in retaining a seal inside a pipe, the retaining band assembly comprising a retaining band having a first end portion and a second end portion, the first end portion having a flat surface and a first edge and the second end portion having a second edge, an expansion block mounted on the flat surface in spaced-apart relation from the first edge to define a receiving surface on the flat surface, the expansion block including an upright face extending in a direction generally normal to the flat surface, the second end portion being arranged to engage the receiving surface so that the upright face of the expansion block is positioned to lie in spaced-apart confronting relation to the second edge of the second end portion, and a clip engaging the second end portion and the first end portion adjacent the receiving surface, the second edge being disposed between the expansion block and the clip.

2. The retaining band assembly of claim 1, wherein the clip includes a top wall, a first side wall appended to the top wall, a second side wall appended to the top wall and arranged to lie opposite to the first side wall, a first tab appended to the first side wall and arranged to extend toward the second side wall, the first tab terminating at a first tab edge, and a second tab appended to the second side wall and arranged to extend toward the first side wall, the second tab terminating at a second tab edge.

3. The retaining band assembly of claim 2, wherein the top wall includes a top wall surface facing away from the first and second end portions, the top wall surface is planar, and the tabs are arranged to maintain engagement between the top wall and the retaining band.

4. The retaining band assembly of claim 3, wherein the retaining band includes an elongated third edge and an opposing elongated fourth edge, the third and fourth edges are positioned to lie adjacent to the flat surface and the first edge, and the first and second side walls are arranged in spaced-apart relation with the first side wall engaging the third edge and the second side wall engaging the fourth edge.

5. The retaining band assembly of claim 2, wherein the retaining band includes an elongated third edge and an opposing elongated fourth edge, the third and fourth edges arranged to lie adjacent to the flat surface and the first edge, and the first and second side walls are arranged in a spaced-apart relation with the first side wall engaging the third edge and the second side wall engaging the fourth edge.

6. The retaining band assembly of claim 5, wherein the first end portion includes a bottom surface opposite the receiving surface, the second end portion includes a received surface engaging the receiving surface and a top surface opposite the received surface, and the distance between the tabs and the top wall is greater than the distance between the top surface and the bottom surface, and the top wall includes a top wall surface facing away from the first and second end portions, the top wall surface being planar, and the tabs are arranged to maintain engagement between the top wall and the retaining band.

7. The retaining band assembly of claim 2, wherein the first end portion includes a bottom surface opposite the receiving surface, the second end portion includes a received surface engaging the receiving surface and a top surface opposite the received surface, and the distance between the tabs and the top wall is greater than the distance between the top surface and the bottom surface.

8. The retaining band assembly of claim 7, wherein the retaining band includes an elongated third edge and an opposing elongated fourth edge, the third and fourth retaining band edges arranged to lie adjacent to the flat surface and the first edge, and the first and second side walls are arranged in a spaced-apart relation with the first side wall engaging the third retaining band edge and the second side wall engaging the fourth retaining band edge.

9. The retaining band assembly of claim 7, wherein the top wall includes a top wall surface facing away from the first and second end portions, the top wall surface being planar, and the tabs are arranged to maintain engagement between the top wall and the retaining band.

10. The retaining band assembly of claim 2, wherein the first tab edge and the second tab edge are arranged in a spaced-apart relationship.

11. The retaining band assembly of claim 2, wherein the first tab edge engages the second tab edge.

12. The retaining band assembly of claim 1, wherein the retaining band includes a third end portion and a fourth end portion, the third end portion having a second flat surface and a third edge, a second expansion block mounted on the second flat surface in spaced-apart relation from the third edge to define a second receiving surface on the second flat surface, the fourth end portion being arranged to engage the second receiving surface, and a second clip engaging the fourth end portion and the third end portion adjacent the second receiving surface, the fourth edge being disposed between the expansion block and the clip.

13. The retaining band assembly of claim 12, wherein the retaining band includes a fifth end portion and a sixth end portion, the fifth end portion having a third flat surface and a fifth edge, a third expansion block mounted on the third flat surface in spaced-apart relation from the fifth edge to define a third receiving surface on the third flat surface, the sixth end portion being arranged to engage the third receiving surface, and a third clip engaging the sixth end portion and the fifth end portion adjacent the third receiving surface, the sixth edge being disposed between the expansion block and the clip.

14. A retaining band assembly for use in retaining a seal inside a pipe, the retaining band assembly comprising a retaining band having a first end portion and a second end portion, the first end portion having a flat surface and a first edge, an expansion block mounted on the flat surface in spaced-apart relation from the first edge to define a tongue-receiving surface on the flat surface, a tongue having a tongue edge, the tongue being mounted on the second end portion and arranged to contact the tongue-receiving surface, and clip means for aligning the first end portion and the tongue in end-to-end relation without penetrating either one of the first end portion and the tongue, the tongue edge being positioned to lie between the expansion block and the clip means.

15. The retaining band assembly of claim 14, wherein the clip means includes retaining means for retaining engagement between the clip means and the retaining band.

16. The retaining band assembly of claim 15, wherein the clip means includes means for maintaining sliding engagement between the tongue-receiving surface and the tongue.

17. The retaining band assembly of claim 14, wherein the retaining band includes a third end portion and a fourth end portion, the third end portion having a second flat surface and a third edge, a second expansion block mounted on the second flat surface in spaced-apart relation from the third edge to define a second tongue-receiving surface on the second flat surface, a second tongue having a second tongue edge, the second tongue mounted on the fourth end portion and arranged to contact the second tongue-receiving surface, and second clip means for aligning the third end portion and the second tongue in end-to-end relation without penetrating either one of the third end portion and the second tongue, the second tongue edge being positioned to lie between the second expansion block and the second clip means.

18. The retaining band assembly of claim 17, wherein the retaining band includes a fifth end portion and a sixth end portion, the fifth end portion having a third flat surface and a fifth edge, a third expansion block mounted on the third flat surface in spaced-apart relation from the fifth edge to define a third tongue-receiving surface on the third flat surface, a third tongue having a third tongue edge, the third tongue mounted on the sixth end portion and arranged to contact the third tongue-receiving surface, and third clip means for aligning the fifth end portion and the third tongue in end-to-end relation without penetrating either one of the first end portion and the third tongue, the third tongue edge disposed between the third expansion block and the third clip means.

19. The retaining band assembly of claim 14, wherein the retaining means includes means for maintaining sliding engagement between the tongue-receiving surface and the tongue.

20. A pipe-sealing assembly for sealing the joint between a first pipe and a second pipe on the inside of the pipe, the sealing assembly comprising a seal member, at least one retaining band having a first end portion and a second end portion, clip means for holding the first end portion in end-to-end relation with the second end portion, a guard disposed between the retaining band and the seal member, and engagement means appended to the clip means for maintaining engagement between the clip means and the retaining band, the engagement means disposed between the retaining band and the guard.

21. The pipe-sealing assembly of claim 20, wherein the clip means includes means for allowing longitudinal movement of the first end portion relative to the second end portion.

22. A pipe-sealing assembly for sealing the joint between a first pipe and a second pipe on the inside of the pipe, the sealing assembly comprising a seal member, at least one retaining band adjacent the seal member, the retaining band having a first end portion and a second end portion, a clip adjacent the first and second end portions, a guard disposed between the retaining band and the seal member, and engagement means appended to the clip for maintaining engagement between the clip and the retaining band, the engagement means disposed between the retaining band and the guard.

23. The pipe-sealing assembly of claim 22, wherein the clip includes means for aligning the first end portion and the second end portion in end-to-end relation with the first end portion overlapping the second end portion without penetrating either one of the first end portion and the second end portion.

24. The pipe-sealing assembly of claim 23, wherein the clip includes means for slidingly coupling the first end portion and the second end portion.

25. A method for closing gaps between pipes, the method comprising the steps of positioning sealing material on the inside of the pipe along the gap, forming two retaining bands by inserting a first retaining strip first end and a first retaining strip second end into a first alignment clip and inserting a second retaining strip first end and a second retaining strip second end into a second alignment clip, engaging the sealing material with the retaining bands, placing a first seal guard between the seal and the first alignment clip retaining tabs and placing a second seal guard between the seal and the second alignment clip retaining tabs, expanding the retaining bands, and installing a locking device on each retaining band.

26. A method for closing gaps between pipes, the method comprising the steps of placing sealing material along the gap on the inside of the pipe, forming two retaining bands by inserting a first retaining strip first end and a first retaining strip second end into a first alignment clip and inserting a second retaining strip first end and a second retaining strip second end into a second alignment clip, engaging the sealing material with the retaining bands, positioning the alignment clips with the first alignment clip engaging the first retaining strip first end and the first retaining strip second end with the edge of the first retaining strip second end positioned between the first alignment clip and the first expansion block and the second alignment clip engaging the second retaining strip first end and the second retaining strip second end with the edge of the second retaining strip second end positioned between the second alignment clip and the second expansion block, expanding the retaining bands, and installing a locking device on each retaining band.

27. A method for closing gaps between pipes, the method comprising the steps of positioning sealing material along the gap on the inside of the pipe, inserting a first retaining band strip and a second retaining band strip into the pipe, forming a first retaining band by inserting a retaining strip first end and a retaining strip second end into a first alignment clip, forming a second retaining band by inserting a retaining strip third end and a retaining strip fourth end into a second alignment clip, engaging the sealing material with the retaining bands, expanding the retaining bands, and installing a locking device on each retaining band.

28. The method of claim 27, wherein the inserting step further includes the step of inserting a third retaining band strip and a fourth retaining band strip into the pipe, the step of forming a first retaining band further includes the step of inserting a retaining strip fifth end and a retaining strip sixth end into a third alignment clip, and the step of forming a second retaining band further includes the step of inserting a retaining strip seventh end and a retaining strip eighth end into a fourth alignment clip.

29. The method of claim 28, wherein the inserting step further includes the step of inserting a fifth retaining band strip and a sixth retaining band strip into the pipe, the step of forming a first retaining band further includes the step of inserting a retaining strip ninth end and a retaining strip tenth end into a fifth alignment clip, and the step of forming a second retaining band further includes the step of inserting a retaining strip eleventh end and a retaining strip twelfth end into a sixth alignment clip.

* * * * *